Nov. 25, 1924.  
F. J. SHOOK  
1,516,622  
SUSPENSION CARRIER  
Filed May 13, 1921
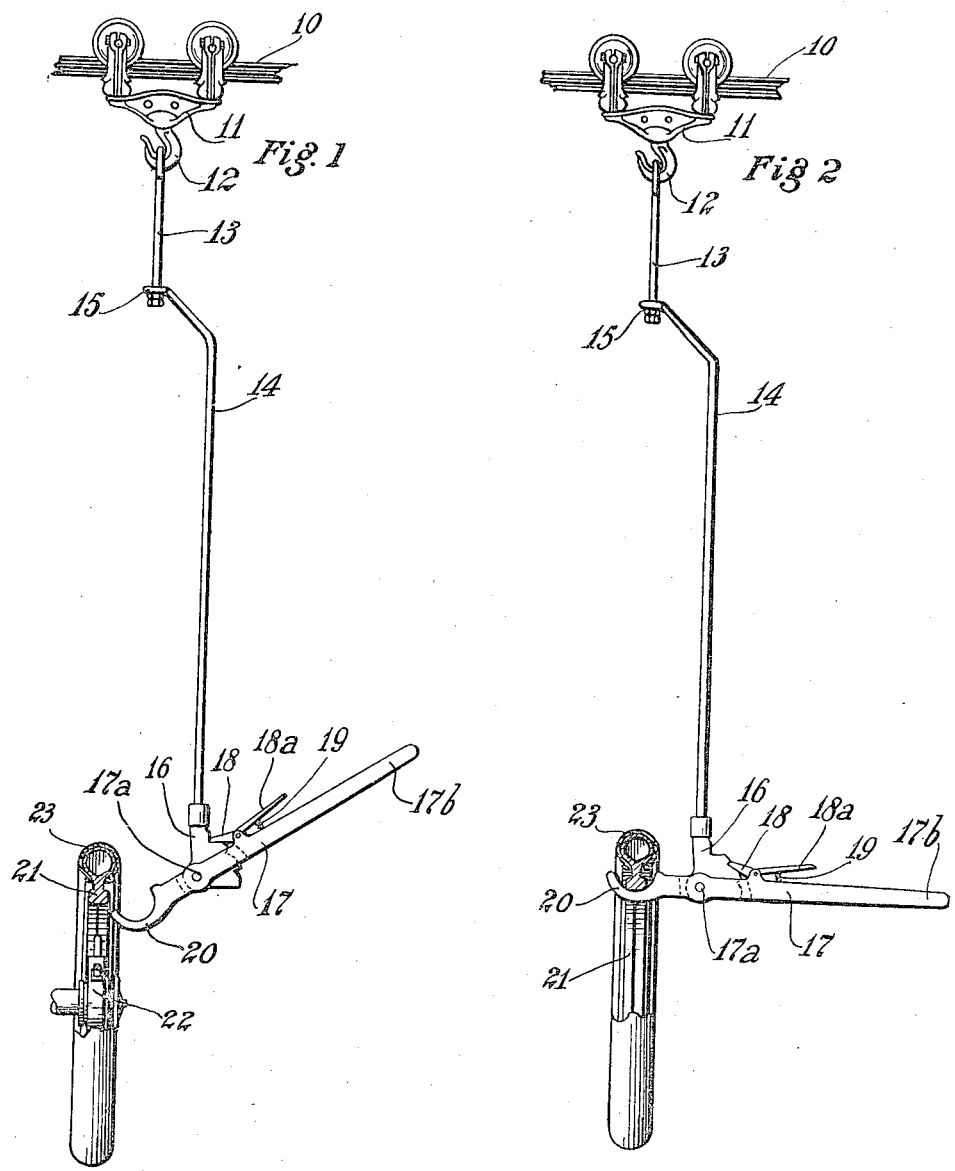
Inventor  
Florain J. Shook  
By Robert M Pierson  
Atty.

Patented Nov. 25, 1924.

1,516,622

UNITED STATES PATENT OFFICE.

FLORAIN J. SHOOK, OF AKRON, OHIO, ASSIGNOR TO THE B. F. GOODRICH COMPANY, OF NEW YORK, N. Y., A CORPORATION OF NEW YORK.

SUSPENSION CARRIER.

Application filed May 13, 1921. Serial No. 469,169.

*To all whom it may concern:*

Be it known that I, FLORAIN J. SHOOK, a citizen of the United States, residing at Akron, in the county of Summit and State of Ohio, have invented a certain new and useful Suspension Carrier, of which the following is a specification.

This invention relates to means for lifting and transporting articles, and particularly to devices wherein the article is suspended from a movable overhead support such as a crane or a traveling carriage mounted on an overhead track.

The object of my invention is to provide an improved device of simple construction for quickly and easily lifting the article clear of its support, suspending it during its transportation and depositing it upon another support, an example being the removal of an annular tire core from a tire-building machine to a tire-finishing stand.

Of the accompanying drawings:

Fig. 1 is a side elevation of a preferred embodiment of my invention in position to engage a tire core supported upon the chuck of a tire-building machine.

Fig. 2 is a similar view of the same in carrying position, with a tire core supported thereon.

Referring to the drawings:

10 is an overhead track upon which is mounted a roller suspension carriage 11 provided on its lower side with a hook 12. 13 is a short depending bar formed at its upper end with an eye interlocked with said hook. 14 is a long, depending bar, a collar thereon having a swivel connection 15 with said bar 13.

To the lower end of the bar 14 is rigidly secured a segmental ratchet plate 16. 17 is a lever fulcrumed at 17ᵃ at the axis of said ratchet-plate and having a long handle-arm 17ᵇ on which is pivoted a latch-pawl 18 adapted to engage the teeth of the ratchet and yieldingly urged against the latter by a spring 19, said pawl having a handle-arm 18ᵃ for retracting it. The short arm of lever 17 is integrally formed with a hook 20 adapted, when said arm is depressed as shown in Fig. 1, to pass under the upper part of a tire core 21 supported on the chuck 22 of a tire-building machine, and shown as having a tire 23 formed thereon. The rod 14 is offset, as shown, so as to clear certain parts of the tire machine.

In the operation of the device, the pawl 18 is disengaged by hand from its ratchet, the handle of the lever 17 is raised, lowering the hook 20, which is passed under the upper part of the tire core. The arms of the chuck 22 being retracted, the core is lifted from the chuck by lowering the handle of the lever 17, whereupon the pawl 18, under action of spring 19, automatically latches the lever 17, preferably in a substantially horizontal position, supporting the tire-core 21 upon the hook 20. The entire device, with the tire-core supported thereon is then moved to the tire-finishing stand, along the track 10, and the core deposited by releasing the latch pawl 18 and allowing the handle of the lever 17 to rise until the hook 20 may be withdrawn. With this device the vertical position of the load may be closely controlled, and the device is thus well adapted to disengage a core from one chuck and accurately mount it upon another without jar or shock, the swivel connection 15 permitting the lever 17 and its load to be turned horizontally to any position with reference to the carriage 11.

The lifting lever being formed with a load-carrying arm, adapted directly to engage the article to be carried, rigid connection is provided between the article and the handle portion of the lever, so that the control of the article in positioning it is positive, and not dependent upon gravity to hold the article to true position with relation to the lever as in the case of a lever provided with a depending load-sustaining chain, where the article and chain may swing with relation to the lever. The bar 14 being much longer than the load-carrying arm of the lever, when the lever with the load thereon is brought to horizontal position and locked, and the hands then removed, the structure does not swing through a very large angle and the lever does not depart substantially from a horizontal position. Consequently the hook 20 continues positively to interlock with and support the article and the latter remains at substantially the same elevation as before the hands were removed, the swinging movement from load-lifting to load-transporting position being only of such magnitude as to bring the article, instead of the fulcrum 17ª, under the point of support of the bar 14.

I claim:

1. A suspension carrier for annular bodies comprising an overhead movable support, a member depending therefrom and adapted to swing in any direction, a lever sustained by said member in fixed oscillatory relation thereto, said lever having a short load-carrying arm provided with a shallow, concave, load-sustaining portion for carrying an annular body directly thereon and a long handle arm, and means for locking said lever in load-sustaining position with the load-carrying arm substantially horizontally disposed, said depending member being of such vertical length in relation to the length of said load-carrying arm and of such rigidity as to permit the transfer of the entire force of the load from the handle portion of said lever to said locking means without substantial departure of said load-carrying arm from a horizontal position.

2. A suspension carrier comprising an overhead traveling carriage, a member depending therefrom, a bar offset at its upper portion and having a swivel connection with said member, a sector plate secured to the lower end of said bar and having ratchet teeth, a lever pivotally supported by the sector, said lever consisting of a unitary bar supported intermediate its ends to provide a short arm adapted to carry the load directly thereon and a long handle arm having a pawl thereon constructed to engage the ratchet teeth of the sector for locking said lever in selective angular positions with relation to said bar, said bar being of such length with relation to the load-carrying arm of said lever as to permit the structure to swing, when the lever is locked with the load supporting arm in horizontal position, from load-lifting to load-transporting position without substantial departure of said arm from a horizontal position.

In witness whereof I have hereunto set my hand this 6th day of May, 1921.

FLORAIN J. SHOOK.